P. V. ELLIOTT.
BUMPER FOR VEHICLES.
APPLICATION FILED AUG. 30, 1918.

1,293,385.

Patented Feb. 4, 1919.

Inventor
Pearl V. Elliott,
By C. E. Humphry
Attorney

UNITED STATES PATENT OFFICE.

PEARL V. ELLIOTT, OF AKRON, OHIO.

BUMPER FOR VEHICLES.

1,293,385. Specification of Letters Patent. Patented Feb. 4, 1919.

Application filed August 30, 1918. Serial No. 252,094.

*To all whom it may concern:*

Be it known that I, PEARL V. ELLIOTT, a citizen of the United States, residing at Akron, in the county of Summit and State of Ohio, have invented new and useful Improvements in Bumpers for Vehicles, of which the following is a specification.

This invention relates to bumpers for use on vehicles and is especially adapted for use in connection with automobiles. The object of the invention is to provide a bumper for each end of each portion of the frame which is independent of the bumper on the corresponding and opposite end of the frame and which projects a sufficient distance from the vehicle to cushion the shock due to a collision between the vehicle and any other object. More particularly the invention contemplates the provision of a bumper attached to each end of the frame or the springs of an automobile and vertically disposed or perpendicular with respect to the roadway so that each spring or end of a frame is provided with its own independent bumper or cushioning device.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention but it is to be understood that changes, variations and modifications can be resorted to which come within the scope of the matter hereinafter claimed.

Figure 1:
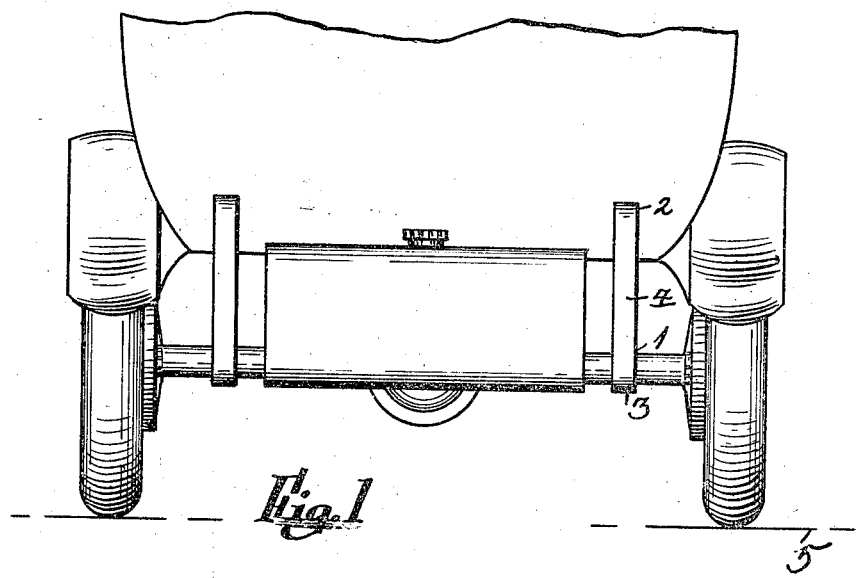
Figure 2:
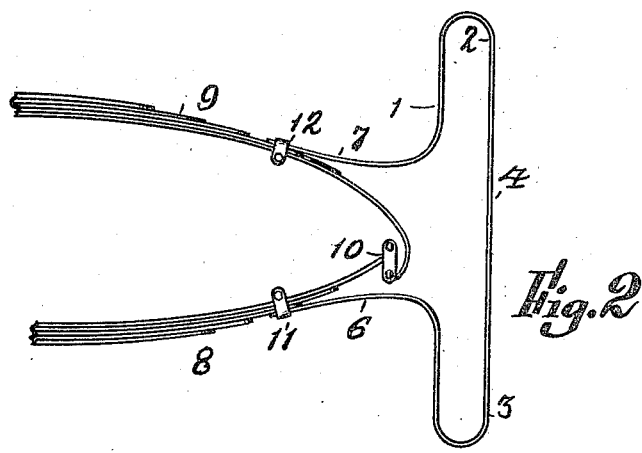

In the drawings in which similar reference numerals indicate like parts in the different drawings, Figure 1 is a view of the rear end of an automobile showing my improved bumpers in position thereon, and Fig. 2 is a side elevation of the springs of an automobile with my bumper attached thereto.

The subject matter of the present invention embodies a spring like member attached to each end of the frame or springs of an automobile, more especially an automobile and comprises a strip of resilient metal 1 formed in the general shape of the letter T with the ends thereof vertically disposed so that the main portion 4 between the ends is substantially perpendicular to the roadway designated by the reference numeral 5. In practice the ends 6 and 7 of the bumpers are widely separated and are attached respectively to the springs 8 and 9 or to the spring and the frame of an automobile. The upper spring 9 is connected with the lower spring 8 by means of a link connection 10, this being the usual practice but other means for connecting the springs may be employed but as the same is unimportant to the present invention, further description is believed to be unnecessary. The ends 6 and 7 are clamped securely to the springs 8 and 9 by means of clips 11 and 12 respectively so as to be removable therefrom but while in position are held firmly against movement. The general form of the spring permits the vertical portion 4 to be spaced from the remaining portions of the device to permit an inbending of the portion 4 in case of collision or the engagement of the device with any other object.

It will be apparent that by providing the bumpers as before described and positioning them at the ends of the frame or at the ends of the springs of an automobile they afford sure and safe protection to the vehicle against damage due to engagement with any other object and as will be seen they project beyond the other working portions of the machine they afford a safeguard against damage to the structure of the automobile.

I claim:

A collision bumper for automobiles comprising a strip of resilient material bent into the general form of a T with the longer portion of the bumper disposed vertically or perpendicular to the roadway and means for securing the bumper to the vehicle.

In testimony whereof I have hereunto set my hand.

PEARL V. ELLIOTT.